United States Patent
Akuka et al.

(10) Patent No.: US 11,503,072 B2
(45) Date of Patent: Nov. 15, 2022

(54) IDENTIFYING, REPORTING AND MITIGATING UNAUTHORIZED USE OF WEB CODE

(71) Applicant: Segasec Labs Ltd., Tel Aviv (IL)

(72) Inventors: Gad Akuka, Ramat Gan (IL); Elad Schulman, Petach Tiqva (IL); Lior Ziv, Be'er Ya'akov (IL); Shahar Arusi Levi, Yavne (IL)

(73) Assignee: MIMECAST ISRAEL LTD., Tel Aviv (IL)

( * ) Notice: Subject to any disclaimer, the term of this patent is extended or adjusted under 35 U.S.C. 154(b) by 253 days.

(21) Appl. No.: 16/916,175

(22) Filed: Jun. 30, 2020

(65) Prior Publication Data
US 2021/0006591 A1 Jan. 7, 2021

Related U.S. Application Data

(60) Provisional application No. 62/869,060, filed on Jul. 1, 2019.

(51) Int. Cl.
*H04L 9/40* (2022.01)

(52) U.S. Cl.
CPC ...... *H04L 63/1483* (2013.01); *H04L 63/1416* (2013.01)

(58) Field of Classification Search
CPC ............. H04L 63/1416; H04L 63/1483; H04L 63/123; H04L 63/108; H04L 63/126; H04L 63/1511; H04L 63/1441; H04L 63/145; H04L 63/1466; H04L 63/02; G06F 21/554; G06F 21/36; G06F 21/54
See application file for complete search history.

(56) References Cited

U.S. PATENT DOCUMENTS

| | | | |
|---|---|---|---|
| 7,958,555 B1* | 6/2011 | Chen | H04L 63/1441 726/25 |
| 9,654,484 B2* | 5/2017 | Grill | H04L 61/1511 |
| 10,104,113 B1* | 10/2018 | Stein | H04L 63/1425 |
| 10,523,680 B2* | 12/2019 | Turgeman | H04L 47/283 |
| 10,581,597 B2* | 3/2020 | Shen | H04L 9/3247 |
| 2010/0186088 A1* | 7/2010 | Banerjee | G06F 21/51 709/224 |
| 2016/0191548 A1* | 6/2016 | Smith | H04L 63/1416 726/23 |
| 2016/0241589 A1* | 8/2016 | Liu | H04L 63/168 |
| 2018/0063190 A1* | 3/2018 | Wright | H04L 63/1425 |
| 2019/0132356 A1* | 5/2019 | Vargas Gonzalez | H04L 63/1425 |
| 2020/0084225 A1* | 3/2020 | McKendall | G06F 21/54 |
| 2021/0211463 A1* | 7/2021 | Cleveland | H04L 63/1416 |

* cited by examiner

*Primary Examiner* — Daniel B Potratz
*Assistant Examiner* — Matthias Habtegeorgis
(74) *Attorney, Agent, or Firm* — Kligler & Associates Patent Attorneys Ltd

(57) ABSTRACT

Methods, apparatuses and computer program products implement embodiments of the present invention that include monitoring use of web code by providing a web agent for embedding into the web code of a protected web site, and upon downloading the web code from a server to a client computer and running the web code on the client computer, identifying, by the web agent, attributes of the server. The attributes are analyzed by the web agent so as to detect malicious use of the web code, and a notification beacon is transmitted by the web agent in response to detecting the malicious use of the web code.

41 Claims, 8 Drawing Sheets

IDENTIFYING, REPORTING AND MITIGATING UNAUTHORIZED USE OF WEB CODE

CROSS-REFERENCE TO RELATED APPLICATIONS

This application claims the benefit of U.S. Provisional Patent Application 62/869,060, filed Jul. 1, 2019, which is incorporated herein by reference.

FIELD OF THE INVENTION

Embodiments of the present invention relate generally to systems and methods for identifying, reporting and mitigating unauthorized use of software code, and particularly unauthorized copying and posting of modified code on websites.

BACKGROUND OF THE INVENTION

Phishing websites are usually a copy, as close as an attacker can create, of an original website. Since a phishing website resembles a legitimate website, it can deceive unsuspecting individuals into thinking that they are using a legitimate website, and induce them to surrender information that the attacker may then use in accessing the legitimate website or elsewhere.

For example, an attacker may create a phishing website that resembles bank's website in an effort to obtain the user's username and password, which the attacker may then use to transfer funds. To perform such copying, the attacker will usually copy the code of the original website and manipulate it to achieve the attacker's aims, while avoiding alerting the original website owner and arousing the suspicion of the end user.

Some methods for detecting phishing attacks are based on actively searching for domain manipulations (similar domain names to the brand name of the site under attack and other company-related keywords) and alerting when a suspicious domain name is detected.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for monitoring use of web code, including providing a web agent for embedding into the web code of a protected web site, upon downloading the web code from a server to a client computer and running the web code on the client computer, identifying, by the web agent, attributes of the server, analyzing the attributes by the web agent so as to detect malicious use of the web code, and transmitting, by the web agent, a notification beacon in response to detecting the malicious use of the web code.

In one embodiment, the malicious use of the web code includes a phishing attack.

In another embodiment, the method also includes automatically terminating the web agent upon determining, by the web agent, that the web code is running in a local environment.

In an additional embodiment, the attributes of the server include a Uniform Resource Locator (URL) for a web page hosted by the server and including the web code, the URL including a character string, and wherein analyzing the attributes of the server includes identifying, by the web agent, each of the characters individually.

In a further embodiment, transmitting the notification beacon includes transmitting the notification beacon upon detecting, by the web agent, the web code includes the web agent being unloaded from a web browser.

In one embodiment, analyzing the attributes includes detecting multiple instances of the malicious use of the web code, and wherein transmitting the notification beacon includes transmitting the notification beacon only for a specified percentage of the specified instances.

In another embodiment, transmitting the notification beacon includes transmitting the notification beacon to a domain name classified as non-suspicious.

In an additional embodiment, transmitting the notification beacon includes embedding, by the web agent, the attributes in a content request, transmitting, by the web agent, the content request to a proxy server, embedding, by the proxy server, the attributes in the notification beacon, and transmitting, by the proxy server, the notification beacon to a security server.

In a further embodiment, the server has an Internet Protocol (IP) address, and wherein detecting, by the web agent, the malicious use of the web code includes comparing the IP address of the server to a predefined list of valid IP addresses, and determining that that the identified IP address is not in the list.

In some embodiments, the list of IP addresses includes a predefined range of IP addresses, and wherein determining that the IP address is not in the list includes determining that the identified IP address is not within the range.

In one embodiment, the server has a domain name, and wherein detecting, by the web agent, the malicious use of the web code includes comparing the domain name of the server to a predefined list of valid domain names, and determining that that the identified domain name is not in the list.

In another embodiment, the server has a Uniform Resource Locator (URL), and wherein detecting, by the web agent, the malicious use of the web code includes comparing the URL of the server to a predefined list of valid URLs, and determining that that the identified URL is not in the list.

In an additional embodiment, detecting, by the web agent, the malicious use of the web code includes detecting the web code downloading content from one or more servers, computing a count of the one or more servers, and determining that the count is less than a predefined threshold.

In a further embodiment, detecting, by the web agent, the malicious use of the web code includes transmitting a predefined Domain Name System (DNS) query having an expected response, receiving a response to the query, and detecting that the received response does not match the expected response.

In a supplemental embodiment, detecting, by the web agent, the malicious use of the web code includes receiving a transmission from the server, and detecting that the received transmission does not include a specified Hypertext Transfer Protocol (HTTP) header.

In one embodiment, detecting, by the web agent, the malicious use of the web code includes transmitting a certificate request to the server, receiving a server certificate in response to the certificate request, and determining that the received server certificate is not valid.

In another embodiment, detecting, by the web agent, the malicious use of the web code includes transmitting a token request to the server, receiving a server token in response to the token request, comparing the received server signatures to a specified list of server signatures, and determining that the received server token is not valid.

In an additional embodiment, detecting, by the web agent, the malicious use of the web includes includes transmitting a signature request to the server, receiving a server signature in response to the signature request, and determining that the received server signature is not valid.

In a further embodiment, detecting, by the web agent, the malicious use of the web code includes transmitting a fingerprint request to the server, receiving a server fingerprint in response to the signature request, and determining that the received server fingerprint is not valid.

In a supplemental embodiment, the method also includes analyzing the web code by the web agent so as to detect unauthorized modification of the web code, and transmitting, by the web agent, the notification beacon in response to detecting the unauthorized modification to the web code.

In another embodiment, the method also includes detecting, by the web agent, content downloaded by the web code, computing, by the web agent a fingerprint over the downloaded content, determining, by the web agent, that the fingerprint is not valid, and transmitting, by the web agent, the notification beacon in response to detecting the unauthorized modification to the web code.

There is also provided, in accordance with an embodiment of the present invention, computer software product for monitoring use of web code, the product including a non-transitory computer-readable medium, in which program instructions are stored, which instructions, when embedded into web code that when downloaded from a server to a client computer and run on the client computer, function as a web agent so as to identify attributes of the server, to analyze the attributes so as to detect malicious use of the web code, and to transmit a notification beacon in response to detecting the malicious use of the web code.

There is additionally provided, in accordance with an embodiment of the present invention, a web code protection computer, including a memory configured to store the web code of a protected web site, and a processor configured to embed a web agent into the web code of the protected site, wherein, upon a client computer downloading the web code from a server and running the web code, the web agent is configured to identify attributes of the server, to analyze the attributes so as to detect malicious use of the web code, and to transmit a notification beacon in response to detecting the malicious use of the web code.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for monitoring use of web code so as to detect unauthorized use of the web code, and particularly types of unauthorized use that may indicate a phishing attack. As described hereinbelow, a web agent is embedded into the web code of a protected web site. Upon the web code subsequently being modified without authorization and downloaded to a client computer, the web agent running on the client computer can identify attributes of the server, and analyze the attributes so as to detect malicious use of the web code. In response to detecting the malicious use of the web code, the web agent can transmit a notification beacon, which can indicate that a phishing attack may be in progress.

In addition to analyzing the attributes of the server on which the web code is running, additional embodiments of the present invention can analyze the web code so as to detect the malicious use. In these embodiments, the web agent can detect unauthorized modifications to the original web code (i.e., the web code from the protected web site).

In further embodiments, the web agent can be embedded in the web code that is to be protected in a way that makes it very difficult for an attacker to detect its presence (and thus neutralize its functionality), for example in the form of obfuscated JavaScript code. The web agent can then detect and report unauthorized use of the copied code, for example in phishing attacks, regardless of the domain name used by the attacker.

Although the embodiments described below relate specifically to the use of the disclosed web agent in detecting possible phishing attacks, the principles of the present invention may similarly be applied in detecting and protecting against illegitimate copying, modification and reuse of web code for other purposes, as well. Such alternative embodiments and applications are also considered to be within the scope of the present invention.

System Description

Figure 1:
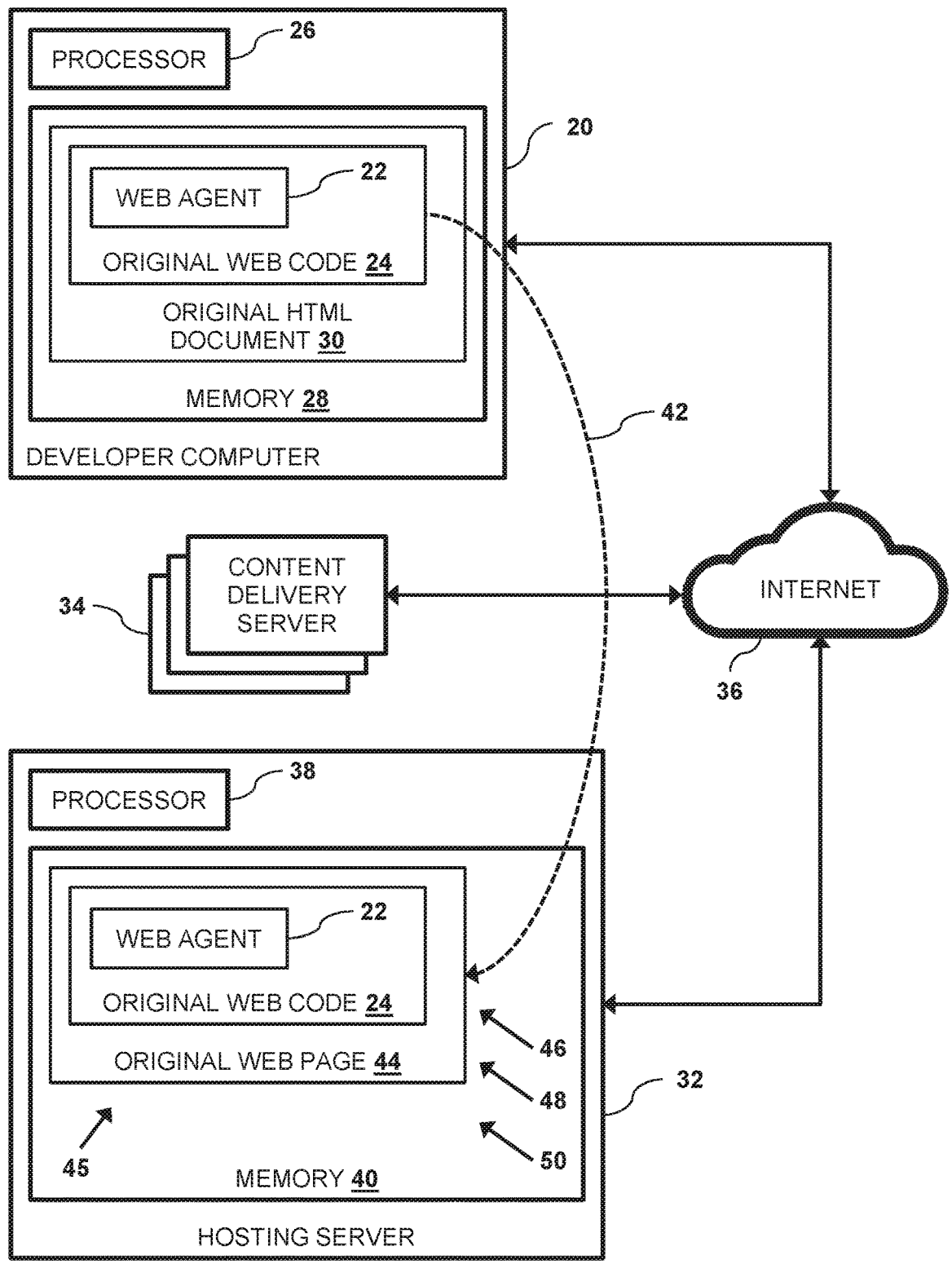
FIG. 1 is a block diagram that schematically illustrates a developer's computer configured to embed a web agent into web code that can be published as a web page, in accordance with an embodiment of the present invention.

FIG. 1 is a block diagram that schematically illustrates an example of a developer computer 20 that is configured to embed a security web agent 22 (also referred to herein as a script) in original web code 24, in accordance with an embodiment of the present invention. Software and data components of web agent 22 are described in the description referencing FIG. 2 hereinbelow.

Developer computer 20 may comprise a processor 26 and a memory 28. Memory 28 is configured to store an original Hypertext Markup Language (HTML) document 30 that comprises web code 24. In some embodiments, upon a programmer (not shown) completing web code 24, the programmer can embed web agent 22 in the original web code.

To embed web agent 22 in original web code 24, the programmer can add a <script> tag to original HTML document 30. In embodiments of the present invention, if an attacker copies the original web code of original HTML document 30, web agent 22 is copied as well, and will then be present in the website (such as a phishing site) created by the attacker. As explained further hereinbelow, web agent 22 can be designed so as to conceal its presence and functionality from the attacker, thereby making it difficult even for skilled attackers to identify the web agent and purge it from the copied web code or otherwise neutralize its functionality.

An example of web agent 22 is Casper™ produced by Mimecast Limited, 1 Finsbury Avenue, London EC2M 2PF, United Kingdom. To embed Casper™ in original web code 24, the programmer can add the following script tag to the original web code under the <head> section:
<script async="async" src=https://Link.js"type="application/javascript"></script>
where "Link.js" comprises a link to the Casper™ JavaScript.

In the configuration shown in FIG. 1, developer computer 20 can communicate with a public server (i.e., a server that is accessible via a public network such as the Internet) such as hosting server 32 and multiple content delivery servers 34 via a public network 36 such as the Internet.

Hosting server 32 may comprise a processor 38 and a memory 40. In some embodiments, processor 38 can convey original web code 24 to hosting server 32 via a transmission 42 over Internet 36. Upon processor 38 receiving transmission 42 and storing the conveyed original web code, processor 38 can publish, in memory 40, original web code 24 (including web agent 22) as an original web page 44 on a protected web site 45.

In some embodiments, web page 44 can have a corresponding public Internet Protocol (IP) address 46, a corresponding public domain name 48, and a corresponding public Uniform Resource Locator (URL) 50. In embodiments described herein, domain names may also be referred to simply as domains.

Figure 2:
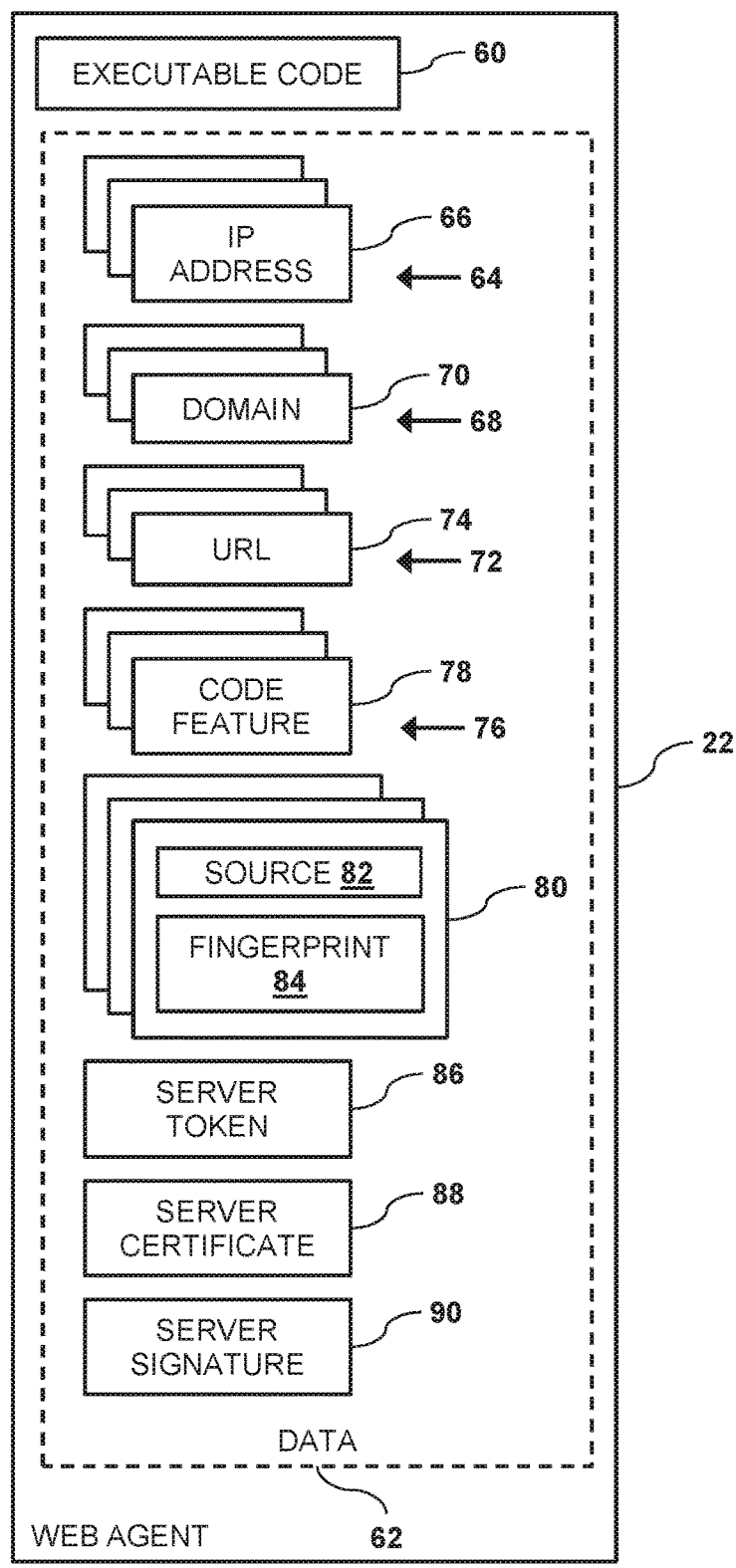
FIG. 2 is a block diagram that schematically illustrates computer software and data components of the web agent, in accordance with an embodiment of the present invention.

FIG. 2 is a block diagram that schematically illustrates software and data components of web agent 22, in accordance with an embodiment of the present invention. Web agent 22 may comprise executable code 60 and web agent data 62. Code 60 is configured to detect phishing attacks, as described hereinbelow. Embodiments herein may describe web agent 22 as performing the phishing attack detection performed by executable code 60.

Examples of web agent data 62 include, but are not limited to:
- An IP address whitelist 64 comprising one or more whitelisted public IP addresses 66. In some embodiments, a given whitelisted public IP address 66 may comprise a whitelisted range of public IP addresses.
- A domain whitelist 68 comprising one or more whitelisted public domain names 70.
- A URL whitelist 72 comprising one or more whitelisted public URLs 74.
- A code feature list 76 comprising one or more code features 78. In some embodiments, web agent 22 can use one or more code features 78 to analyze and detect changes to original web code 24. In one example, a given code feature 78 may comprise a target fingerprint. Note that the target fingerprint, as well as any code that performs the fingerprint test, might itself be hidden within web code 24, e.g., via steganography in images or other binary files. In an alternative embodiment, web agent 22 may comprise one or more algorithms that enable the web agent to perform comparisons so as to detect changes to web code 24, despite changes such as formatting.
- One or more fingerprint records 80. Each fingerprint record 80 may comprise information such as a fingerprint source 82 and a corresponding computed fingerprint 84. In one example, a given fingerprint source 82 may indicate a public server such as hosting server 32. In this example, web agent 22 can download, from a given server (e.g., hosting server 32), a public key and a reference key (both not shown), compute, using the public key, the corresponding fingerprint 84, and compare the computed fingerprint to the reference fingerprint so as to validate the given server. In another example, a given fingerprint source 82 may indicate content (e.g., an image) that web code 24 (or any other web code) is configured to download from a given content delivery server 34, and web agent 22 can compute the corresponding fingerprint 84 so as to validate the content.
- A server token 86 that web code 24 (or any other web code) can download from a public server such as hosting server 32 so as to validate the public server.
- A server certificate 88 that web code 24 (or any other web code) can download from a public server such as hosting server 32 so as to validate the public server.
- A server signature 90 that web code 24 (or any other web code) can download from a public server such as hosting server 32 so as to validate the public server.

In some embodiments, as described hereinbelow, web agent 22 can be configured does not interfere with any processes used by an attacker, and to stay dormant until the actual start of the fraudulent acts in which victims may be involved.

Figure 3:
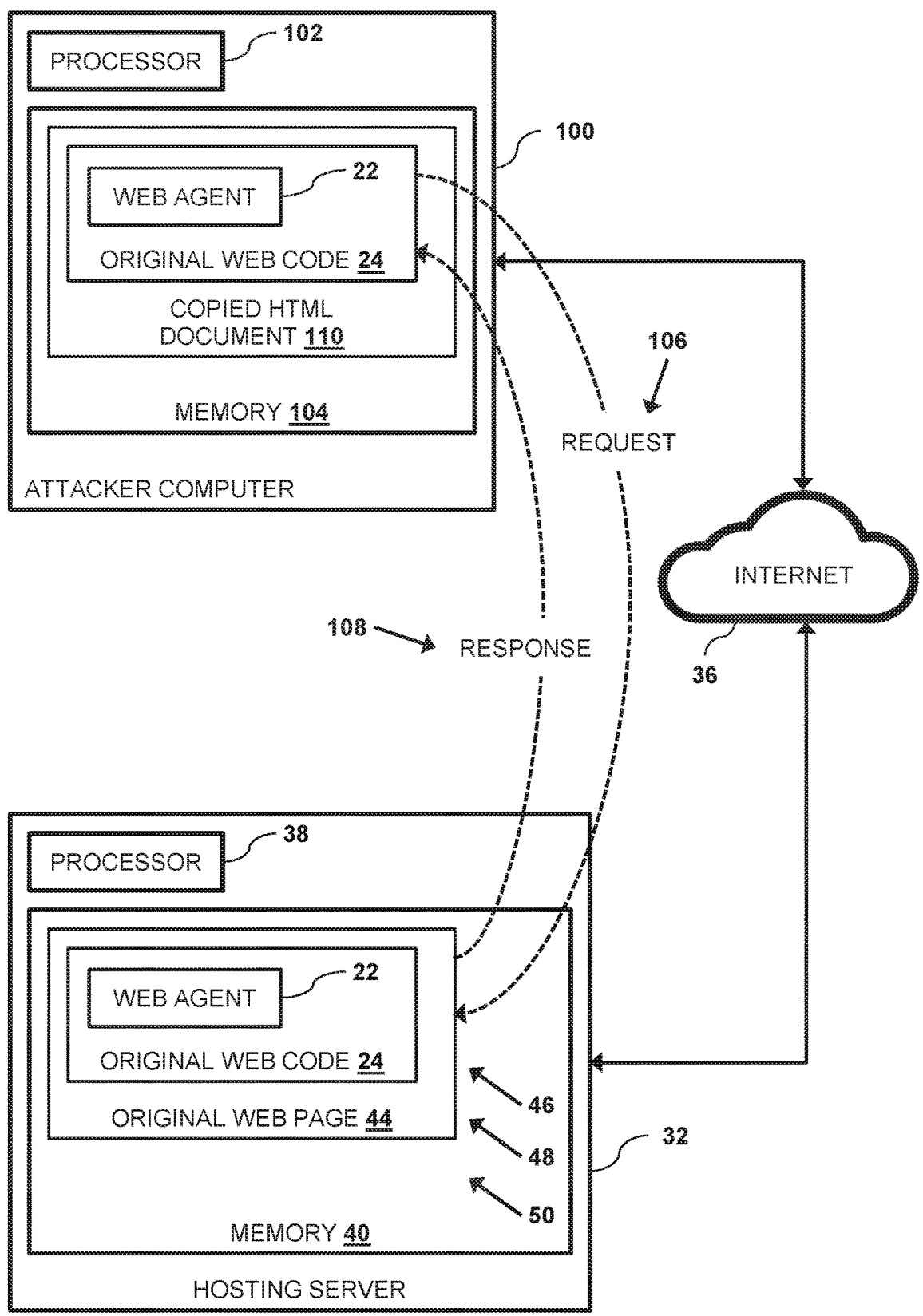
FIG. 3 is a block diagram that schematically illustrates an attack computer configured to retrieve the web code comprising the web agent, in accordance with an embodiment of the present invention.

FIG. 3 is a block diagram that schematically illustrates an attack computer 100 configured to download original web page 44 from hosting server 32 so as to launch a phishing attack, in accordance with an embodiment of the present invention. Attack computer 100 comprises a processor 102 and a memory 104.

In the configuration shown in FIG. 3, processor 102 transmits, via Internet 36, a request 106 to hosting server 32, and in response to receiving the request, the hosting server conveys, in a response 108, original web page 44 to attack computer 100. Upon receiving the response, processor 102 stores the received web page to memory 104 as a copied HTML document 110.

For example, an attacker (not shown) can instruct processor 102 to download all or at least a part of original web page 44, for example using a third-party tool (like HTTrack, SiteSucker, curl, wget, etc.) or using the built-in "Save As" feature of browser 134. The embedded web agent 22, such as a JavaScript, provided by embodiments of the present invention will be downloaded at this stage together with the rest of original web code 44.

Figure 4:
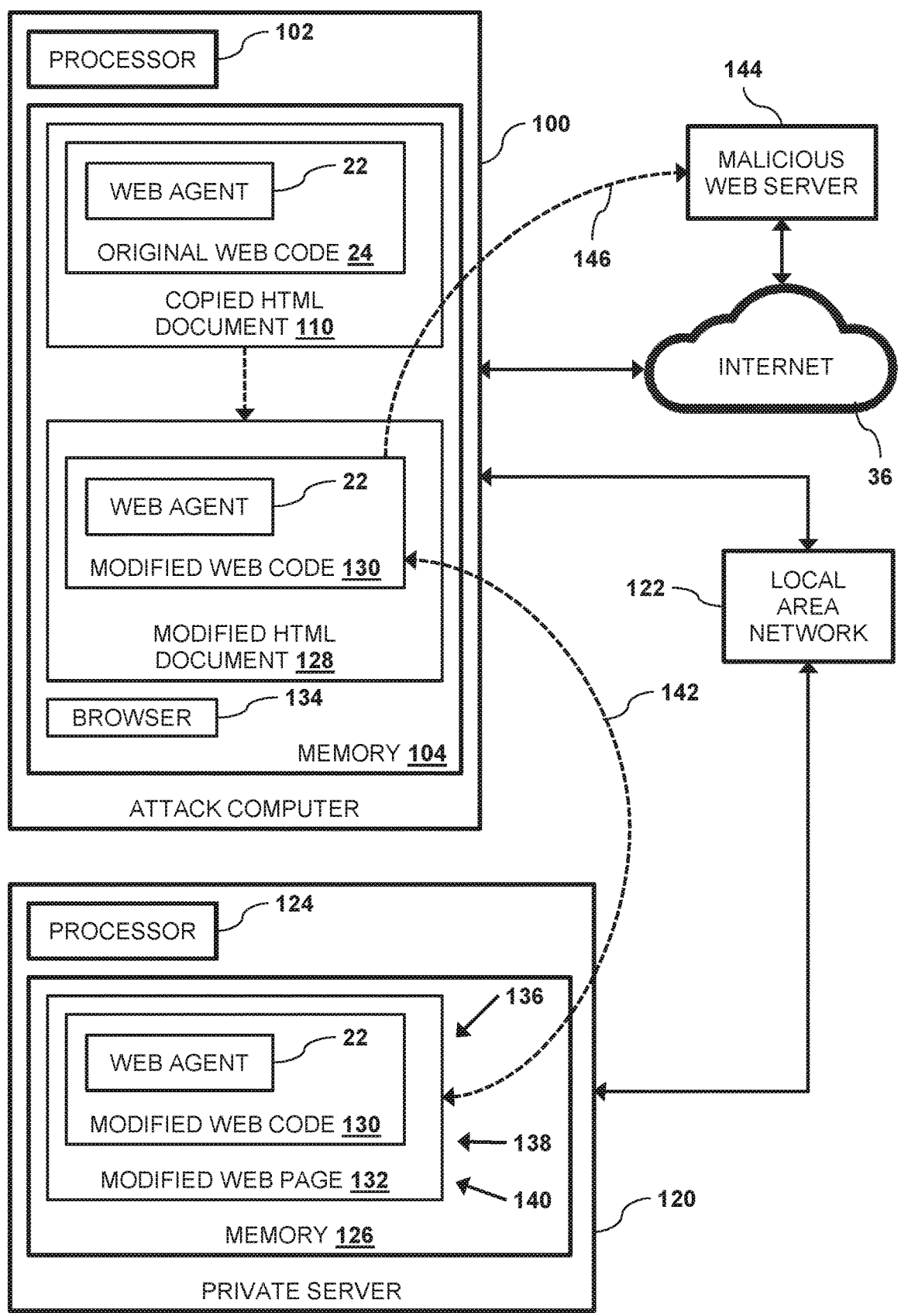
FIG. 4 is a block diagram that schematically illustrates the attack computer modifying the web code, and publishing the modified web code to a modified web page, in accordance with an embodiment of the present invention.

FIG. 4 is a block diagram that schematically illustrates attack computer 100 that communicates with a private server 120 over a local area network (LAN) 122, in accordance with an embodiment of the present invention. Private server 120 may comprise a processor 124 and a memory 126. In some embodiments, private server 120 may only be accessible to computers coupled to LAN 122 (i.e., the private server operates in a local environment and may not be accessed via Internet 36).

To initiate a phishing attack, the attacker can modify the original web code in copied HTML document 110 so as to create, in memory 104, a modified HTML document 128 comprising modified web code 130 (i.e., including web agent 22). While creating and revising modified web code, processor 102 can convey, via LAN 122, modified HTML document 128 to private server 120. Upon receiving and storing modified HTML document 128 to memory 126, processor 124 can publish the modified HTML document to a modified web page 132 in memory 126.

In one example of a phishing attack, the attacker can revise web code 130 to suit the attacker's purposes, for example to edit a login page to capture the end users' login details and any other information the attacker wishes to illegally acquire.

In the configuration shown in FIG. 4, modified web page 132 can have a corresponding local IP address 136 a corresponding local domain name 138 and a corresponding local URL 140. In some embodiments, local IP address 136 local domain name 138, and local URL 140 are only "visible" in a local environment comprising computing devices coupled to LAN 122. Additionally, in the configuration shown in FIG. 4, attack computer can use transmissions 142 over LAN 122 to convey modified web code 130 to private server 120 and to test modified web page 132 on private server 120.

In some embodiments, processor 102 can execute, from memory 104, a browser 134, that the attacker can use to test modified web page 132. The attacker can then make minor changes to allow the downloaded web code to run on a local computing device (e.g., attack computer 100), usually in an environment that is not connected to an external network (e.g., Internet 36) in order to avoid activating anti-phishing measures. Anti-phishing web agent 22 is present at this stage, but can be configured to remain inactive as long as the code is running in the attacker's local environment.

While revising and testing modified web code 130, the attacker will typically investigate and analyze the web code and remove any traceable codes. Such codes may include, for example, JavaScript libraries, such as Google Analytics and well-known phishing detection tools. In this context, the attacker may search for any attempt by the code to create outgoing communications. The attacker can analyze any such real-time request and determine whether it is a legitimate request, such as for retrieving a picture from a content distribution network (CDN) or file server or information such as current currency information (such as in a bank's website). The fact that web agent 22 can be obfuscated and can be configured to remain inactive at this stage makes it difficult for the attacker to understand and remove it.

Upon the attacker finalizing revisions to modified web code 130, processor 102 can transmit modified HTML document 128 (i.e., comprising a finalized version of modified web code 130) to a malicious server 144 via a transmission 146 over Internet 36. Malicious server 144 is described in the description referencing FIG. 5 hereinbelow.

Figure 5:
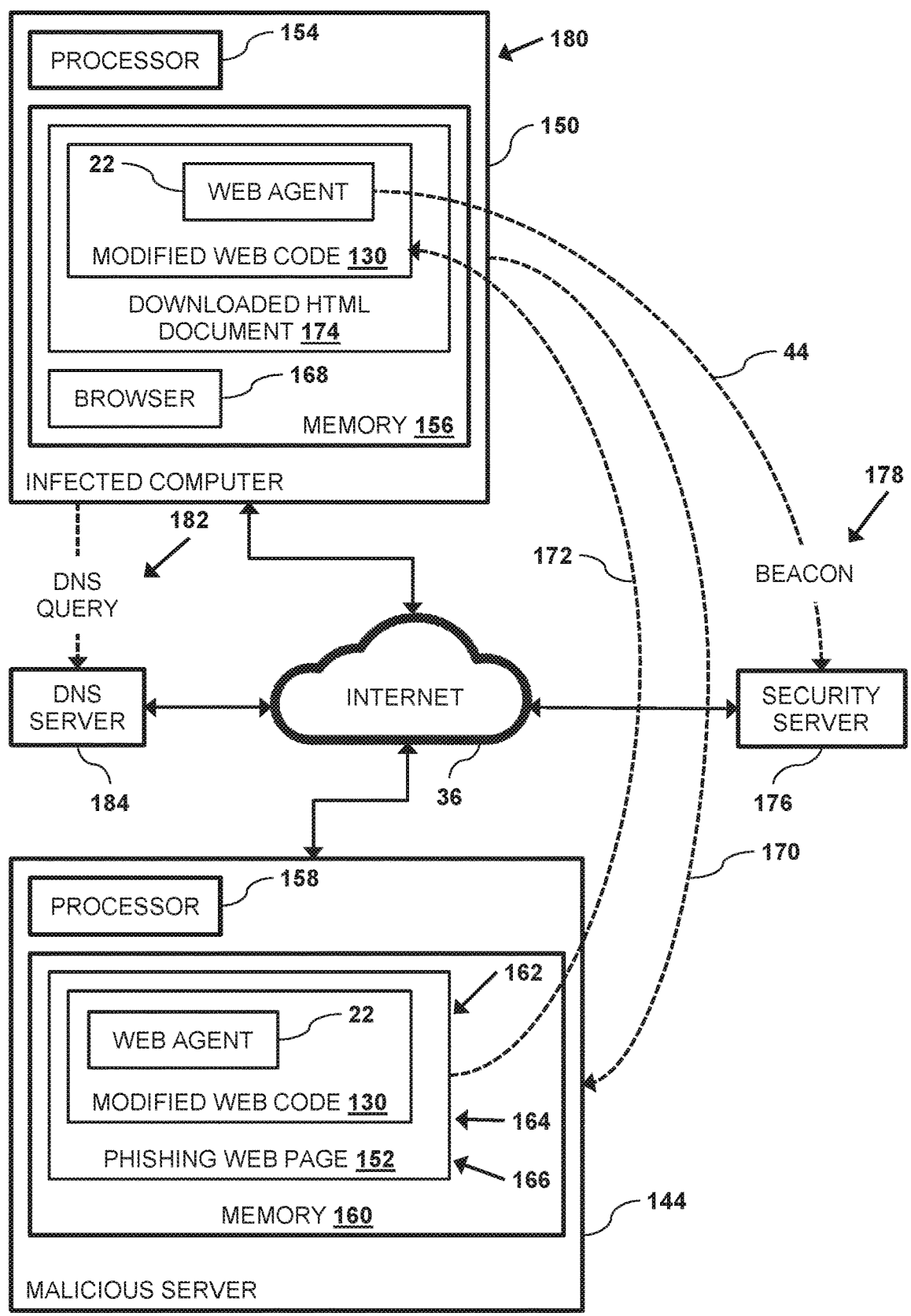
FIG. 5 is a block diagram that schematically illustrates the web agent executing on an infected computer that downloaded the modified web page, and configured to transmit a notification beacon upon detecting malicious activity of the modified web code, in accordance with an embodiment of the present invention.

FIG. 5 is a block diagram that schematically illustrates a phishing attack on an infected computer 150 that accesses, on malicious server 144, a phishing web page 152 so as to download modified HTML document 128 comprising web agent 22, in accordance with an embodiment of the present invention. Infected computer 150 may comprise a processor 154 and a memory 156, and malicious server 144 may comprise a processor 158 and a memory 160.

As described supra, attack computer 100 can transmit, to malicious server 144, modified HTML document 128 comprising modified web code 130 and web agent 22. Upon malicious server 144 receiving modified HTML document 128, processor 158 can store, to memory 160, modified web code 130 comprising web agent 22 to memory 160 the modified web code as phishing web page 152. In some embodiments, phishing web page 152 can have a corresponding public IP address 162, a corresponding public domain name 164, and a corresponding public URL 166 that the attacker can publish for the phishing web page.

In some embodiments, IP addresses 46, 136 and 162, domain names 48, 136 and 164, and URLs 50, 138 and 166 may reference the respective servers hosting web pages 44, 132 and 152 instead of the web pages themselves. In other words, hosting server 32 may correspond to IP address 46, domain name 48 and URL 50, server 120 may correspond to IP address 136, domain name 138 and URL 140, and server 144 may correspond to IP address 162, domain 164 and URL 166.

In the configuration shown in FIG. 5, processor 154 executes, from memory 156, a web browser 168. In the phishing attack, a user (not shown) operating web browser 168 may click on a malicious link (not shown), which instructs processor 154 to transmit, to malicious server 144 via Internet 36, a request 170 to download phishing web page 152. In response to receiving request 170, processor 158 transmits, to infected computer 150 via Internet 36, a response 172 comprising modified web code 130 that includes web agent 22. Processor 154 can store the received modified web code comprising web agent 22 to downloaded HTML document 174 in memory 156.

Upon processor 154 storing downloaded HTML document 174 and executing web code 130, web agent 22 uses embodiments described herein to detect the phishing attack. In response to detecting the phishing attack, web agent 22 transmits, to a security server 176 via Internet 36, a notification beacon 178. In some embodiments, notification beacon 178 may comprises a public IP address 180 of infected computer 150 so as to help identify a victim of the phishing attack.

In some embodiments as described hereinbelow, web agent 22 can detect the phishing attack by detecting anomalies in a Domain Name System (DNS) query 182 that processor 154 transmits to a DNS server 184 via Internet 36.

Processors 26, 38, 102, 124, 154 and 158 comprise general-purpose central processing units (CPU) or special-purpose embedded processors, which are programmed in software or firmware to carry out the functions described herein. This software may be downloaded to computers 20, 100, 150 and servers 32, 120, 144 in electronic form, over a network, for example. Additionally or alternatively, the software may be stored on tangible, non-transitory computer-readable media, such as optical, magnetic, or electronic memory media. Further additionally or alternatively, at least some of the functions of processors 26, 38, 102, 124, 154 and 158 may be carried out by hard-wired or programmable digital logic circuits.

Examples of memories 28, 40, 104, 126, 156 and 160 include dynamic random-access memories, non-volatile random-access memories, and non-volatile storage devices such as hard disk drives and solid-state disk drives.

Malicious Website Deployment and Phishing Attack Detection

Figure 6:
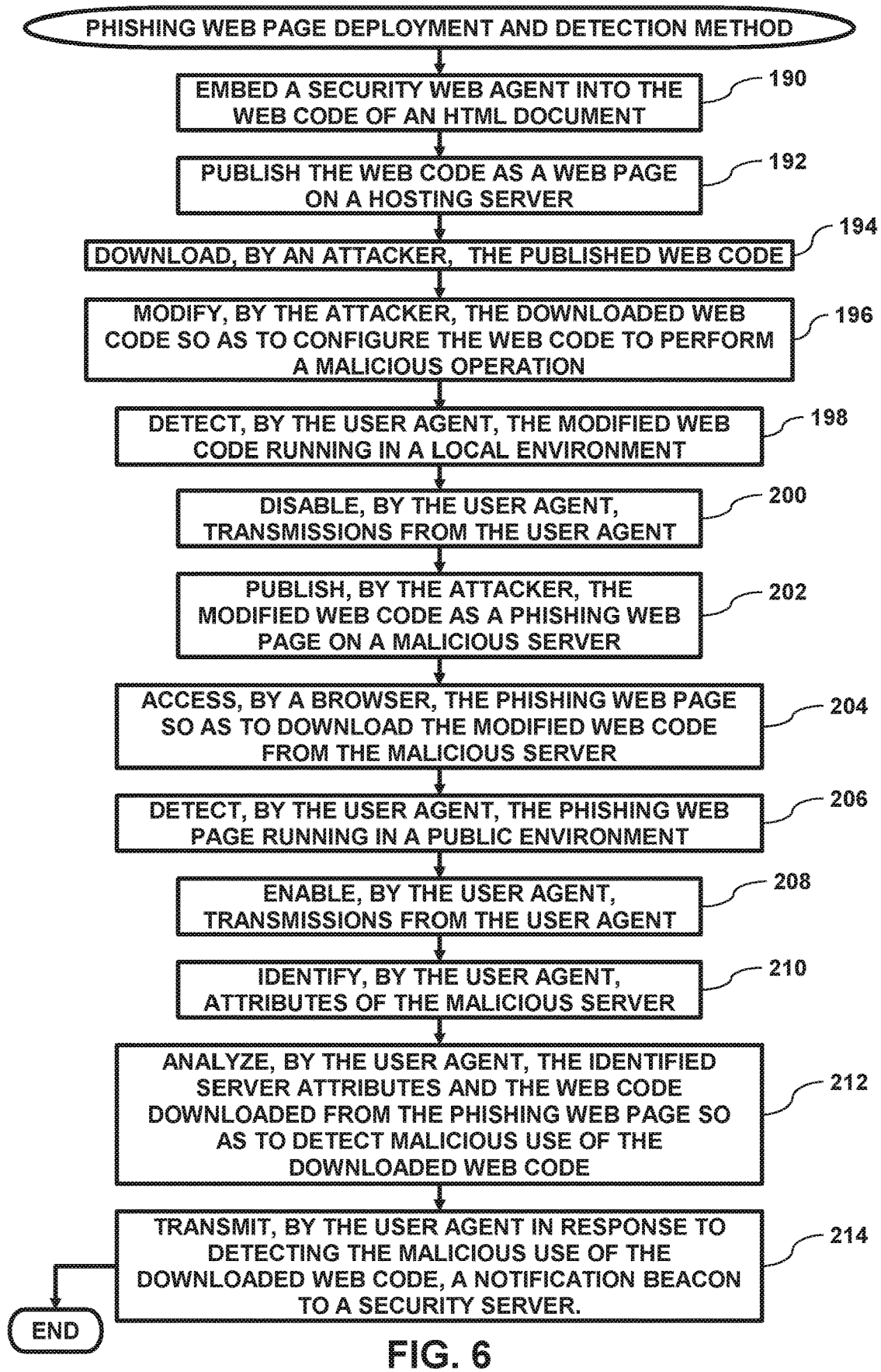
FIG. 6 is a flow diagram that schematically illustrates a method of detecting the malicious activity of the published modified web code, in accordance with an embodiment of the present invention.

FIG. 6 is a flow diagram that schematically illustrates a method of web agent 22 detecting a website comprising phishing web page 152, in accordance with an embodiment of the present invention.

In step 190, processor 26 creates original HTML document 30 by embedding web agent 22 into original web code 24, and conveys the original web code to hosting server 32.

In step 192, hosting server 32 publishes original web code 24 (i.e., including web agent 22) as original web page 44 that can be accessed via Internet 36. Details for steps 190 and 192 are described in the description referencing FIG. 1 hereinabove.

In step 194, attack computer 100 downloads, from host server 32, original web code 24 that includes web agent 22. Details for step 194 are described in the description referencing FIG. 3 hereinabove.

In step 196, an attacker operating computer 100 modifies the downloaded original web code so as to create modified web code 130 that is configured to perform a malicious operation. For example in a phishing attack, the modifications may comprise replacing web links that originally referenced hosting server 32 with web links that reference malicious web server 144 belonging to the attacker. Since the web agent that is embedded in original web code does not reference hosting server 32, it is typically difficult for the attacker to detect and remove web agent 22 from the original web code.

In embodiments of the present invention, web agent 22 employ programming techniques that make it difficult for the attacker to detect the presence of the web agent. In one embodiment, web agent 22 may be programmed not to generate any (potentially traceable) transmissions when the web agent is running in a local environment.

For example, when the attacker is modifying original web code 24, attacker may test modified web code 130 by publishing the modified web code to modified web page 132 on private web server 120, and using browser 134 to access and test the modified web page. As described supra, modified web page 132 may be published to a local environment by being mapped to local IP address 136, local domain name 138 and local URL 140.

In step 198, web agent 22 detects that modified web page 132 comprising modified web code 130 and the web agent is running in a local environment. In step 200, in response to detecting the web agent running in a local environment, web agent 22 can stay dormant, thereby suspending any and all notifications and/or transmissions (i.e., by the web agent).

Additional details and methods of obfuscating web agent 22 are described in Appendix 1 hereinbelow.

In step 202, processor 102 publishes modified web page 132 to a malicious web site such as phishing web 152 page on malicious server 144. Details for steps 196-202 are described in the description referencing FIGS. 4 and 5 hereinabove.

Steps 194-202 describe steps of producing phishing web page 152. To launch the attack, malicious server 144 (or any other computing device coupled to Internet 36) can transmit, to potential victims, emails comprising malicious web links to phishing web page 152 on malicious web server 144. The attack on infected computer 150 starts by an unsuspecting victim operating browser 168 on the infected computer opening the email, and clicking on the malicious web link.

In step 204, in response to the unsuspecting victim clicking on the malicious link, browser 168 accesses phishing web page 152 so as to download modified web code 130 from malicious server 144. As described in the description referencing FIG. 5 hereinabove, public IP address 162, public domain name 164 and public URL 166 correspond (i.e., can be used to reference) phishing web page 152. Therefore, in embodiments described herein phishing web page 152 comprising web agent 22 can be considered to be running in a public environment (i.e., as opposed to modified web page 132 which as described supra is considered to be running in a local environment when hosted on private server 120).

In step 206, web agent 22 detects that phishing web page 152 comprising the web agent is running in a public environment. In step 208, in response to detecting web agent 22 running in a public environment, the web agent enables transmissions from the web agent.

In step 210, web agent 22 identifies attributes of the server hosting the web page accessed by browser 168. In this example of a phishing attack, web agent 22 identifies attributes of malicious server 144. Examples of the identified attributes include public IP address 162, public domain name 164 and public URL 166. Additional examples of the server attributes that can be identified by web agent 22 are described in Appendix 2 hereinbelow.

In step 212, web agent 22 analyzes the identified server attributes and analyzes the web code (e.g., the modified web code in phishing web page 152) downloaded in step 204 so as to detect malicious use of the download web code that can indicate a phishing attack (or any other type of cyberattack). Examples of analyses that web agent 22 can perform on the downloaded web code are described in Appendix 2 hereinbelow.

Finally, in step 214, in response to detecting the malicious use of the web code, web agent 22 transmits, over Internet 36, notification beacon 178 to security server 176, and the method ends. In some embodiments, notification beacon 178 can include information about phishing web page 152 and information about the unsuspecting victim (whose personal information may have been compromised in the attack), thereby enabling security server 176 to start taking take appropriate action to halt the phishing attack and, when possible, apprehend the attacker responsible for the attack.

Examples of information about malicious phishing web page 152 that web agent 22 can collect and include in notification beacon 178 includes public IP address 162, public domain name 164, public URL 166 and any web proxies used by the malicious phishing page. Examples of information on the unsuspecting victim that web agent 22 can collect and include in notification beacon 178 include public IP address 180 and a username (not shown) of the victim. In some embodiments, security server 176 can use the information collected and conveyed by web agent 22 to identify the victims who have been compromised, as well as a geographical area targeted by the attack Appendix 1: Web Agent Obfuscation In a first obfuscation embodiment of the present invention, as described supra in the description of steps 198, 200, 208 and 210 of the flow diagram presented in FIG. 6, web agent 22 can be configured to terminate itself or to remain dormant, for example, by refraining from generating any transmissions (including notification beacon 178) upon detecting that it is executing in a local environment.

In some embodiments, web agent 22 can be configured to activate itself upon the loading of the embedded web agent by a web browser. In order to stay hidden for as long as possible, however, when browser 168 loads a web page (e.g., phishing web page 152), web agent 22 may test and identify whether it is running on a local computer in a local environment (e.g., on attack computer 100 as described in the description referencing FIG. 4 hereinabove), or on a computer that is coupled to Internet 36 (e.g., on infected computer 150 as described in the description referencing FIG. 5 hereinabove) in a public environment.

The script may use a method such as the second obfuscation embodiment described hereinbelow to check the current URL or IP address of the web page on which it is running in order to determine whether it is a valid domain name or a public IP address—meaning that the page is running in a public environment—or an invalid domain name or private IP address, characteristic of a local environment. When the script identifies that the web page is not running on a web server and/or that it is running in a local environment, the script may terminate itself or otherwise stay dormant in order to avoid detection by the attacker.

Figure 7:
FIG. 7 is a code listing showing the web agent obfuscated in the web code, in accordance with an embodiment of the present invention.

FIG. 7 is a code listing 220 that can be used to conceal web agent 22 in original web code 24, in accordance with a second obfuscation embodiment of the present invention. As code listing 220 shows, the web code is not easily readable by a human. Therefore, the attacker will typically need to use other means to decipher the web code in order to detect web agent 22.

In a third obfuscation embodiment, web agent 22 may use the following JavaScript code to identify the URL (e.g., URL 166) that browser 168 accessed so as to download the web code comprising the web agent:

```
for (var d in __window)
    {
    if (d.length === 8
        && d.charCodeAt (7) === 116
        && d.charCodeAt (5) === 101
        && d.charCodeAt (3) === 117
        && d.charCodeAt (0) === 100)
        {
        __document = d;
        break;
        }
    }
```

Instead of the more conventional 'window.document' browser function to identify the URL (which hackers look for in this sort of anti-phishing scripts), this code provides a subtler and stealthy method to read the URL (i.e., comprising a character string) one character at a time.

In a fourth obfuscation embodiment of the present invention, web agent 22 may initiate communication (e.g., transmitting notification beacon 178) only after in the web page containing the web agent has been unloaded from browser 168, meaning that the user has closed the web page or exited entirely from the web site or browser. This delay in activation may allow web agent 22 to completely hide its external communications from the attacker, as it makes it much harder to recognize that the communication is related to the web page and in particular to the script.

In some embodiments of the invention, service workers run by the script as a background process may be used to initiate communication by the script only after a certain time (seconds or minutes) has elapsed after unloading of the web page containing the script. This waiting time may be fixed, or it may be randomized. In either case, the attacker will not be able to see the network call by the script in the network tab of the browser, and in any event will probably no longer be watching for anti-phishing activity. Additionally or alternatively, the script may manipulate the browser stack trace to hide the network call from later detection by the attacker.

In a fifth obfuscation embodiment of the present invention, web agent 22 may be configured to be fully activated only some instances. For example, upon detecting multiple instances of malicious use of the web code, web agent 22 may be set to transmit the notification beacon to security server 176 only for a specified percentage of the detections.

In a sixth obfuscation embodiment of the present invention, web agent 22 may configure notification beacon 178 to have the form of a call to an apparently innocent domain. An example of such a domain is a domain that is the attacker would classify as non-suspicious, thereby considering it logical for the website to call. In one embodiment, an arrangement can be made with a trusted unsuspicious site to receive and process notification beacon 178. In a second example, the owner of web site 45 can choose innocuous looking domains 48 and use them to receive and process notification beacon 178. In another embodiment, the owner of web site 45 can post the malicious use information in a public forum for another use, such as the test newsgroups on and old USENIX newsgroup, or in a comments section of a posted news article.

Figure 8:
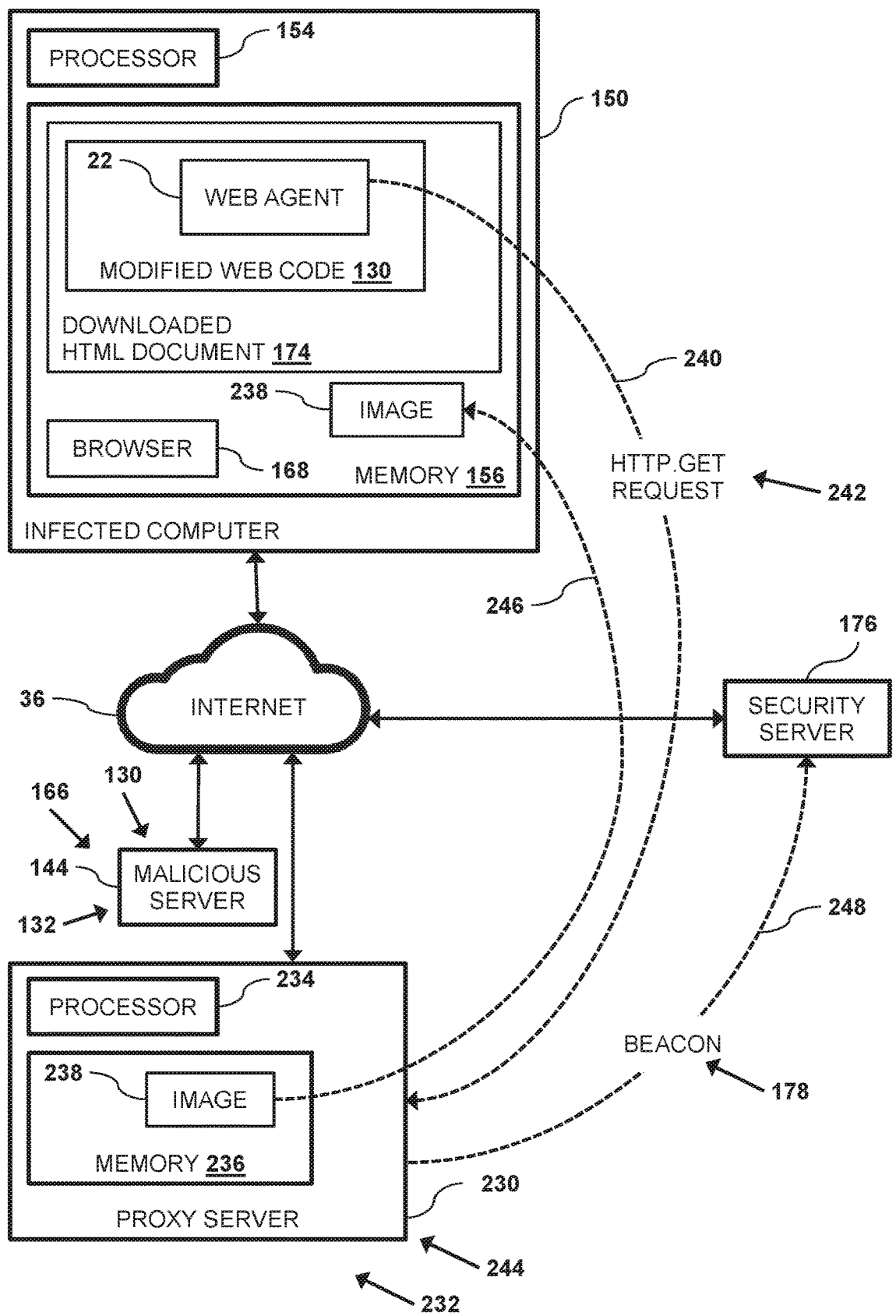
FIG. 8 is a block diagram that schematically illustrates a proxy server configured to obfuscate activity of the web agent, in accordance with an embodiment of the present invention.

FIG. 8 is a block diagram that schematically illustrates a proxy server 230 that can be used to help conceal the operation of web agent 22 in original web code 24, in accordance with a seventh obfuscation embodiment of the present invention. In this obfuscation embodiment, proxy server 230 has an "innocent" domain name 232, and web agent 22 can avoid arousing the attacker's suspicion by instructing the proxy server to transmit notification beacon 178. In the configuration shown in FIG. 8, proxy server 230 comprises a processor 234 and a memory 236 that is configured to store an image 238.

In this embodiment, web agent 22 can generate a transmission 240 that is disguised as a call requesting to load data, such as image 238, from proxy server 230 that is disguised as a content delivery server. For example, although the most commonly used way to send information to an external server would be using an 'HTTP POST' request, web agent 22 may embed the information (such as URL 166 of web page 132 on which modified code 130 is running) in transmission 240 using an 'HTTP GET' content request 242, which is disguised to appear as a normal picture loading request.

For example, a URL 244 for proxy server 230 may be encrypted and included as a tag in the URL path of the HTT.GET, as depicted in the following JavaScript code:
https://an-innocent-domain/images/<domain-id>/<location.href-as-hash>/<image>.png
In this example, the tag <location.href-as-hash> may be computed by applying any suitable sort of scrambling or encryption function to phishing URL 166.

In some embodiments of the invention, upon proxy server 230 receiving HTTP.GET request 242, the proxy server may actually return, in transmission 246, image 238 for web agent 22 to store in memory 156 and to load by web code 139 executing on browser 168, and hence not alert the attackers about the real purpose of the external communication. Proxy server 230 can also decode the tag to recover the encoded URL (or forward the tag to a separate cyber-security server for this purpose). In this embodiment, upon processor 234 receiving HTTP.GET request 242 and recovering the encoded URL, processor 234 can convey, via a transmission 248 to security server 176, the encoded URL (and other information as described supra) in notification beacon 178.

Processor 234 comprises a general-purpose central processing unit (CPU) or a special-purpose embedded processor, which is programmed in software or firmware to carry out the functions described herein. This software may be downloaded to proxy server 230 in electronic form, over a network, for example. Additionally or alternatively, the software may be stored on tangible, non-transitory computer-readable media, such as optical, magnetic, or electronic memory media. Further additionally or alternatively, at least some of the functions of processor 234 may be carried out by hard-wired or programmable digital logic circuits.

Examples of memory 236 include dynamic random-access memories, non-volatile random-access memories, and non-volatile storage devices such as hard disk drives and solid-state disk drives.

In embodiments described in Appendix 2 hereinbelow, web agent 22 can use one or more whitelists to determine that a website (i.e., accessed by any web code comprising the web agent) is not a threat. In an eighth obfuscation embodiment of the present invention, upon web agent 22 determining, via the whitelist(s), that the website is not a threat, then the web agent may terminate itself or otherwise stay dormant. Since this embodiment can use one or more whitelists embedded in web agent 22, no external communication by the web agent is required to flag any websites as suspicious, thereby making the web agent difficult for the attacker to detect.

Appendix 2: Detecting Malicious Use of Web Code

In embodiments of the present invention, web agent 22 is configured to detect malicious use of web code (e.g., web code 24 and web code 130) that browser 168 downloads from a web server. In a first malicious use of web code detection embodiment, web agent 22 can detect malicious use of web code by analyzing attributes of the web server (e.g., servers 32 and 144) from which the browser downloaded the web code.

In a first web server attribute embodiment, web agent 22 can identify the IP address (e.g., IP addresses 46 and 162) of the server (e.g., servers 32 and 144) or the web page (e.g., web pages 44 and 152), and compare the identified IP address to IP addresses 66 in IP address whitelist 64. If web agent 22 does not detect a match between the identified IP address and any IP address 66, then the web agent can flag the downloaded web code as suspected of malicious use.

As described supra, a given IP address 66 may comprise a range of public IP addresses. In this embodiment, comparing the identified IP address to the given IP address may comprise comparing the identified IP address to the range of public IP addresses, and not detecting the match may comprise detecting that the identified IP address is not in the range.

In a second web server attribute embodiment, web agent 22 can identify the domain name (e.g., domain names 48 and 164) of the server (e.g., servers 32 and 144) or the web page (e.g., web pages 44 and 152), and compare the identified domain name to domain names 70 in domain name whitelist 68. If web agent 22 does not detect a match between the identified domain name and any domain name 70, then the web agent can flag the downloaded web code as suspected of malicious use.

In a third web server attribute embodiment, web agent 22 can identify the URL (e.g., URLs 50 and 166) of the server (e.g., servers 32 and 144) or the web page (e.g., web pages 44 and 152), and compare the identified URL to URLs 74 in URL whitelist 72. If web agent 22 does not detect a match between the identified URL and any URL 74, then the web agent can flag the downloaded web code as suspected of malicious use.

In a fourth web server attribute embodiment, web agent 22 can compute a count of distinct content delivery servers 34 that the web code accesses so as to download content (e.g., images). In this embodiment, the web agent can compare the computed count to a predefined threshold (e.g., two), and can flag the downloaded web code as suspected of malicious use if the count is less than the threshold.

In a fifth web server attribute environment, web agent 22 can transmit, to DNS server 184, DNS query 182, and expect a specific response to the given DNS query. Upon receiving a response to the given DNS query, web agent 22 can compare the received response to the specific response, and flag the downloaded web code as suspected of malicious use if the received response does not match the specific response.

In a sixth web server attribute environment, web agent 22 can compare HTTP headers of transmissions received from the web server from which browser 168 downloaded the web code to a specified HTTP header. If web agent 22 detects that the received HTTP header does not match the specified HTTP header, then the web agent can flag the downloaded web code as suspected of malicious use.

In a seventh web server attribute environment, web agent 22 can convey a certificate request to the web server from which browser 168 downloaded the web code. Upon receiving server certificate 88 from the web server in response to the request, the web server can determine whether or not the received server certificate is valid. If web agent 22 determines that the received server certificate is not valid, then the web agent can flag the downloaded web code as suspected of malicious use. In one embodiment, web agent 22 can convey the received server certificate to a trusted third party for validation. In another embodiment, web agent 22 can validate the server certificate using cryptographic information encoded steganographically in the web code itself.

In an eighth web server attribute environment, web agent 22 can convey a token request to the web server from which browser 168 downloaded the web code. Upon receiving server token 86 from the web server in response to the request, web agent 22 can determine whether or not the received server token is valid. If web agent 22 determines that the received server token is not valid, then the web agent can flag the downloaded web code as suspected of malicious use. Web agent 22 can validate the server token in a manner similar to validating the server certificate, as described hereinabove In a ninth web server attribute environment, web agent 22 can convey a signature request to the web server from which browser 168 downloaded the web code. Upon receiving server signature 90 from the web server in response to the request, web agent 22 can determine whether or not the received server signature is valid. If web agent 22 determines that the received server signature is not valid, then the web agent can flag the downloaded web code as suspected of malicious use. Web agent 22 can validate the server signature in a manner similar to validating the server certificate, as described hereinabove.

In additional embodiments, web agent 22 can validate server certificates, server signatures, and server signatures of content server(s) 34 accessed by the original and the modified web code.

In a tenth web server attribute environment, web agent 22 can convey a fingerprint request to a given server (i.e., the web server from which browser 168 downloaded the web code or a given content delivery server 34). In response to the fingerprint request, web agent 22 can receive a public key. Using the public key, web agent 22 can compute a fingerprint, and compare it to fingerprint 84 (i.e., the reference fingerprint) in a given fingerprint record 80 whose source 82 references the given server. If web agent 22 detects that the computed fingerprint does not match fingerprint 84 in the given fingerprint record, then the web agent can flag the downloaded web code as suspected of malicious use.

Alternatively, web agent 22 can receive a server fingerprint in response to the fingerprint request, analyze the received server fingerprint to determine its validity, and upon determining that the received server fingerprint is not valid, flag the downloaded code as suspected of malicious use.

In a second malicious use of web code detection embodiment, web agent 22 can detect malicious use of web code by analyzing the downloaded web code to detect any unauthorized changes to the downloaded web code.

In a first unauthorized code detection embodiment, web agent 22 can compute a fingerprint over any downloaded content (e.g., original web code 24, modified web code 130 or any image downloaded from any content delivery server 34), and compare it to fingerprint 84 in a given fingerprint record 80 whose respective source 82 references the downloaded content. If web agent 22 detects that the computed fingerprint does not match fingerprint 84 in the given fingerprint record, then the web agent can flag the downloaded web code as suspected of malicious use.

In some embodiments, web agent 22 can analyze fingerprint 84 using fuzzy matching and de-obfuscating algorithms that can detect various types of near-matches. This enables the web agent to make more intelligent decisions about programs, e.g., noting that inconsequential program alterations might have been made to obfuscate (for example, change "set x=1; set y=2" to "set y=2; set x=1").

In a second unauthorized code detection embodiment, web agent 22 can analyze the downloaded web code to detect any changes. In some embodiments, web agent 22 may use piracy detection algorithms to perform this analysis It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for monitoring use of web code, comprising:
   providing a web agent for embedding into the web code of a protected web site;
   upon downloading the web code from a server to a client computer and running the web code on the client computer, identifying, by the web agent, attributes of the server;
   based on the identified attributes, determining by the web agent whether the web code is running in a public environment or in a local environment, in which the server is accessed via a local area network, and automatically terminating the web agent upon determining that the web code is running in the local environment;
   analyzing the attributes by the web agent so as to detect malicious use of the web code; and
   when the web code is running in the public environment, transmitting, by the web agent, a notification beacon in response to detecting the malicious use of the web code.

2. The method according to claim 1, wherein the malicious use of the web code comprises a phishing attack.

3. The method according to claim 1, wherein the attributes of the server comprise a Uniform Resource Locator (URL) for a web page hosted by the server and comprising the web code, the URL comprising a character string, and wherein analyzing the attributes of the server comprises identifying, by the web agent, each of the characters individually.

4. The method according to claim 1, wherein transmitting the notification beacon comprises transmitting the notification beacon upon detecting, by the web agent, the web code comprising the web agent being unloaded from a web browser.

5. The method according to claim 1, wherein analyzing the attributes comprises detecting multiple instances of the malicious use of the web code, and wherein transmitting the notification beacon comprises transmitting the notification beacon only for a specified percentage of the specified instances.

6. The method according to claim 1, wherein transmitting the notification beacon comprises transmitting the notification beacon to a domain name classified as non-suspicious.

7. The method according to claim 1, wherein transmitting the notification beacon comprises embedding, by the web agent, the attributes in a content request, transmitting, by the web agent, the content request to a proxy server, embedding, by the proxy server, the attributes in the notification beacon, and transmitting, by the proxy server, the notification beacon to a security server.

8. The method according to claim 1, wherein the server has an Internet Protocol (IP) address, and wherein detecting, by the web agent, the malicious use of the web code comprises comparing the IP address of the server to a predefined list of valid IP addresses, and determining that that the identified IP address is not in the list.

9. The method according to claim 8, wherein the list of IP addresses comprises a predefined range of IP addresses, and wherein determining that the IP address is not in the list comprises determining that the identified IP address is not within the range.

10. The method according to claim 1, wherein the server has a domain name, and wherein detecting, by the web agent, the malicious use of the web code comprises comparing the domain name of the server to a predefined list of valid domain names, and determining that that the identified domain name is not in the list.

11. The method according to claim 1, wherein the server has a Uniform Resource Locator (URL), and wherein detecting, by the web agent, the malicious use of the web code comprises comparing the URL of the server to a predefined list of valid URLs, and determining that that the identified URL is not in the list.

12. The method according to claim 1, wherein detecting, by the web agent, the malicious use of the web code comprises detecting the web code downloading content from one or more servers, computing a count of the one or more servers, and determining that the count is less than a predefined threshold.

13. The method according to claim 1, wherein detecting, by the web agent, the malicious use of the web code comprises transmitting a predefined Domain Name System (DNS) query having an expected response, receiving a response to the query, and detecting that the received response does not match the expected response.

14. The method according to claim 1, wherein detecting, by the web agent, the malicious use of the web code comprises receiving a transmission from the server, and detecting that the received transmission does not comprise a specified Hypertext Transfer Protocol (HTTP) header.

15. The method according to claim 1, wherein detecting, by the web agent, the malicious use of the web code comprises transmitting a certificate request to the server, receiving a server certificate in response to the certificate request, and determining that the received server certificate is not valid.

16. The method according to claim 1, wherein detecting, by the web agent, the malicious use of the web code comprises transmitting a token request to the server, receiving a server token in response to the token request, comparing the received server signatures to a specified list of server signatures, and determining that the received server token is not valid.

17. The method according to claim 1, wherein detecting, by the web agent, the malicious use of the web code comprises transmitting a signature request to the server, receiving a server signature in response to the signature request, and determining that the received server signature is not valid.

18. The method according to claim 1, wherein detecting, by the web agent, the malicious use of the web code comprises transmitting a fingerprint request to the server, receiving a server fingerprint in response to the signature request, and determining that the received server fingerprint is not valid.

19. The method according to claim 1, and comprising analyzing the web code by the web agent so as to detect unauthorized modification of the web code, and transmitting, by the web agent, the notification beacon in response to detecting the unauthorized modification to the web code.

20. The method according to claim 1, and comprising detecting, by the web agent, content downloaded by the web code, computing, by the web agent a fingerprint over the downloaded content, determining, by the web agent, that the fingerprint is not valid, and transmitting, by the web agent, the notification beacon in response to detecting the unauthorized modification to the web code.

21. A computer software product for monitoring use of web code, the product comprising a non-transitory computer-readable medium, in which program instructions are stored, which instructions, when embedded into web code that when downloaded from a server to a client computer and run on the client computer, function as a web agent so as:
to identify attributes of the server;
to determine, based on the identified attributes, whether the web code is running in a public environment or in a local environment, in which the server is accessed via a local area network, and to terminate the web agent automatically upon determining that the web code is running in the local environment;
to analyze the attributes so as to detect malicious use of the web code; and
to transmit, when the web code is running in the public environment, a notification beacon in response to detecting the malicious use of the web code.

22. The computer software product according to claim 21, wherein the malicious use of the web code comprises a phishing attack.

23. The computer software product according to claim 21, wherein the attributes of the server comprise a Uniform Resource Locator (URL) for a web page hosted by the server and comprising the web code, the URL comprising a character string and wherein the web agent is configured to analyze the attributes of the server comprises identifying each of the characters individually.

24. The computer software product according to claim 21, wherein the web agent is configured to transmit the notification beacon by transmitting the notification beacon upon detecting the web code comprising the web agent being unloaded from a web browser.

25. The computer software product according to claim 21, wherein the web agent is configured to analyze the attributes by detecting multiple instances of the malicious use of the web code, and wherein the web agent is configured to transmit the notification beacon by transmitting the notification beacon only for a specified percentage of the specified instances.

26. The computer software product according to claim 21, wherein the web agent is configured to transmit the notification beacon by transmitting the notification beacon to a domain name classified as non-suspicious.

27. The computer software product according to claim 21, wherein the web agent is configured to transmit the notification beacon by embedding the attributes in a content request, transmitting the content request to a proxy server, embedding, by the proxy server, the attributes in the notification beacon, and transmitting, by the proxy server, the notification beacon to a security server.

28. The computer software product according to claim 21, wherein the server has an Internet Protocol (IP) address, and wherein the web agent is configured to detect the malicious use of the web code by comparing the IP address of the server to a predefined list of valid IP addresses, and determining that that the identified IP address is not in the list.

29. The computer software product according to claim 28, wherein the list of IP addresses comprises a predefined range of IP addresses, and wherein the web agent is configured to determine that the IP address is not in the list by determining that the identified IP address is not within the range.

30. The computer software product according to claim 21, wherein the server has a domain name, and wherein the web agent is configured to detect the malicious use of the web code by comparing the domain name of the server to a predefined list of valid domain names, and determining that that the identified domain name is not in the list.

31. The computer software product according to claim 21, wherein the server has a Uniform Resource Locator (URL), and wherein the web agent is configured to detect the malicious use of the web code by comparing the URL of the server to a predefined list of valid URLs, and determining that that the identified URL is not in the list.

32. The computer software product according to claim 21, wherein the web agent is configured to detect the malicious use of the web code by detecting the web code downloading content from one or more servers, computing a count of the one or more servers, and determining that the count is less than a predefined threshold.

33. The computer software product according to claim 21, wherein the web agent is configured to detect the malicious use of the web code by transmitting a predefined Domain Name System (DNS) query having an expected response, receiving a response to the query, and detecting that the received response does not match the expected response.

34. The computer software product according to claim 21, wherein the web agent is configured to detect the malicious use of the web code by receiving a transmission from the server, and detecting that the received transmission does not comprise a specified Hypertext Transfer Protocol (HTTP) header.

35. The computer software product according to claim 21, wherein the web agent is configured to detect the malicious use of the web code by transmitting a certificate request to the server, receiving a server certificate in response to the certificate request, and determining that the received server certificate is not valid.

36. The computer software product according to claim 21, wherein the web agent is configured to detect the malicious use of the web code by transmitting a token request to the server, receiving a server token in response to the token request, comparing the received server signatures to a specified list of server signatures, and determining that the received server token is not valid.

37. The computer software product according to claim 21, wherein the web agent is configured to detect the malicious use of the web code by transmitting a signature request to the server, receiving a server signature in response to the signature request, and determining that the received server signature is not valid.

38. The computer software product according to claim 21, wherein the web agent is configured to detect the malicious use of the web code by transmitting a fingerprint request to the server, to receive a server fingerprint in response to the signature request, and determining that the received server fingerprint is not valid.

39. The computer software product according to claim 21, wherein the web agent is further configured to analyze the web code by the software agent so as to detect unauthorized modification of the web code, and to transmit the notification beacon in response to detecting the unauthorized modification to the web code.

40. The computer software product according to claim 21, wherein the web agent is further configured to detect content downloaded by the web code, to compute a fingerprint over the downloaded content, to determine that the fingerprint is not valid, and to transmit the notification beacon in response to detecting the unauthorized modification to the web code.

41. A web code protection computer, comprising:
- a memory configured to store the web code of a protected web site; and
- a processor configured to embed a web agent into the web code of the protected site, wherein, upon a client computer downloading the web code from a server and running the web code, the web agent is configured:
  - to identify attributes of the server,
  - to determine, based on the identified attributes, whether the web code is running in a public environment or in a local environment, in which the server is accessed via a local area network, and to terminate the web agent automatically upon determining that the web code is running in the local environment;
  - to analyze the attributes so as to detect malicious use of the web code; and
  - to transmit, when the web code is running in the public environment, a notification beacon in response to detecting the malicious use of the web code.

* * * * *